(12) United States Patent
Boutros et al.

(10) Patent No.: US 11,824,772 B2
(45) Date of Patent: *Nov. 21, 2023

(54) OPTIMIZED L2/L3 SERVICES OVER CLASSICAL MPLS TRANSPORT

(71) Applicant: Ciena Corporation, Hanover, MD (US)

(72) Inventors: Sami Boutros, Union City, CA (US); Muthurajah Sivabalan, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,270

(22) Filed: Dec. 18, 2020

(65) Prior Publication Data

US 2022/0200903 A1 Jun. 23, 2022

(51) Int. Cl.
| | |
|---|---|
| *H04L 12/46* | (2006.01) |
| *H04L 45/50* | (2022.01) |
| *H04L 45/42* | (2022.01) |
| *H04L 45/48* | (2022.01) |
| *H04L 45/00* | (2022.01) |

(52) U.S. Cl.
CPC .......... *H04L 45/50* (2013.01); *H04L 12/4641* (2013.01); *H04L 45/42* (2013.01); *H04L 45/48* (2013.01); *H04L 45/72* (2013.01)

(58) Field of Classification Search
CPC ..... H04L 12/4641; H04L 45/42; H04L 45/48; H04L 45/50; H04L 45/72
USPC .......................................... 709/230–232, 238
See application file for complete search history.

(56) References Cited

U.S. PATENT DOCUMENTS

| | | | |
|---|---|---|---|
| 8,295,278 | B2 | 10/2012 | Shah et al. |
| 8,711,838 | B1 * | 4/2014 | Guichard ............ H04L 12/4633 370/351 |
| 8,948,055 | B2 | 2/2015 | Bragg |
| 9,531,627 | B1 | 12/2016 | Alvarez et al. |
| 9,538,423 | B2 | 1/2017 | Alvarez et al. |
| 9,979,629 | B2 | 5/2018 | Sivabalan et al. |
| 10,069,639 | B2 | 9/2018 | Bragg et al. |

(Continued)

OTHER PUBLICATIONS

Aug. 19, 2021, International Search Report and Written Opinion for International Patent Application No. PCT/US2021/031283.

(Continued)

*Primary Examiner* — Younes Naji
*Assistant Examiner* — Da T Ton
(74) *Attorney, Agent, or Firm* — Baratta Law PLLC; Lawrence A. Baratta, Jr.

(57) ABSTRACT

Systems and methods in a node in an MPLS network include determining a plurality of services supported at the node; determining a bitmask to represent the plurality of services supported at the node, wherein the bitmask includes a starting service and each subsequent bit representing another service of the plurality of services and with each bit in the bitmask set based on the plurality of services supported at the node; and transmitting an advertisement to other nodes in the network with the bitmask based on the plurality of services supported at the node. The steps can further include transmitting a packet associated with a service of the plurality of services with an MPLS label stack including one or more transport labels for a destination of the packet, a service label identifying the service, and a source label identifying a source Internet Protocol (IP) address of the packet.

20 Claims, 10 Drawing Sheets

(56) References Cited

U.S. PATENT DOCUMENTS

| | | |
|---|---|---|
| 10,153,948 B2 | 12/2018 | Ong |
| 10,250,494 B2 | 4/2019 | Sivabalan et al. |
| 2009/0122724 A1* | 5/2009 | Rosenberg .............. H04L 45/02 370/255 |
| 2010/0235525 A1* | 9/2010 | McGuire ................. H04L 67/16 709/228 |
| 2012/0177054 A1* | 7/2012 | Pati .................... H04L 12/4625 370/395.53 |
| 2015/0288602 A1 | 10/2015 | Bragg et al. |
| 2016/0261497 A1* | 9/2016 | Arisoylu ............. H04L 12/4633 |
| 2016/0380886 A1 | 12/2016 | Blair et al. |
| 2018/0324090 A1* | 11/2018 | Duncan ............... H04L 12/4641 |
| 2018/0375968 A1 | 12/2018 | Bashandy et al. |
| 2019/0132221 A1 | 5/2019 | Boutros et al. |
| 2019/0245787 A1 | 8/2019 | Skalecki et al. |
| 2020/0153732 A1* | 5/2020 | Negi ....................... H04L 45/12 |
| 2022/0078114 A1* | 3/2022 | Peng ................... H04L 12/4633 |

OTHER PUBLICATIONS

J. Rabadan et al., Internet Engineering Task Force (IETF), Category: Standards Track, ISSN: 2070-1721, Framework for Ethernet VPN Designated Forwarder Election Extensibility, Apr. 2019, pp. 1-32.

C. Filsfils et al., Spring Internet-Draft, Standards Track, Expires: Aug. 26, 2020, SRv6 Network Programming draft-ietf-spring-srv6-network-programming-10, Feb. 23, 2020, pp. 1-38.

A. Sajassi et al., Internet Engineering Task Force (IETF), Category: Informational, ISSN: 2070-1721, Requirements for Ethernet VPN (EVPN), May 2014, pp. 1-15.

A. Sajassi et al., Internet Engineering Task Force (IETF), Category: Standards Track, ISSN: 2070-1721, A Network Virtualization Overlay Solution Using Ethernet VPN (EVPN), Mar. 2018, pp. 1-33.

* cited by examiner

OPTIMIZED L2/L3 SERVICES OVER CLASSICAL MPLS TRANSPORT

FIELD OF THE DISCLOSURE

The present disclosure generally relates to networking. More particularly, the present disclosure relates to systems and methods for optimized Layer 2 (L2)/Layer 3 (L3) services over classical Multiprotocol Label Switching (MPLS) transport.

BACKGROUND OF THE DISCLOSURE

Example L2/L3 services include Ethernet Local Area Network (ELAN), Ethernet Tree (ETREE), Ethernet Private Line (ELINE), Flexible Cross Connect (FXC), Layer 3 Virtual Private Network (L3VPN), and the like. An ELAN is a multipoint-to-multipoint service that connects a number of User-Network Interfaces (UNIs) (2 or more), providing full mesh connectivity for those sites. Each UNI can communicate with any other UNI that is connected to that Ethernet service. An ETREE is a rooted multipoint service that connects a number of UNIs providing sites with hub and spoke multipoint connectivity. Each UNI is designated as either root or leaf. A root UNI can communicate with any leaf UNI, while a leaf UNI can communicate only with a root UNI. An ELINE is a service type defined for connecting exactly 2 UNIs where those 2 UNIs can communicate only with one another. An Ethernet Virtual Private Network (EVPN)-Virtual Private Wire Service (VPWS) FXC is introduced to address label resource issue that occurs on some low-end access routers (also known as A-leaf) by having a group of Attachment Circuits (ACs) under the same EVPN instance (EVI) share the same label. A Border Gateway Protocol (BGP)/MPLS VPN, i.e., a Layer 3 (L3) VPN (L3VPN), enables a service provider to use an Internet Protocol (IP) backbone to provide IP VPNs for customers.

These example L2/L3 services have heavy control plane overhead, scalability concerns, and operational complexity. To address these concerns, Applicant and Inventors proposed support for these L2/L3 services in a scalable and simpler manner over Segment Routing (SR) networks. For example, this is described in, commonly-assigned U.S. patent application Ser. No. 16/870,113, filed May 8, 2020, and entitled "EVPN signaling using Segment," commonly-assigned U.S. patent application Ser. No. 17/007,084, filed Aug. 31, 2020, "NG-VPLS E-tree signaling using Segment Routing," commonly-assigned U.S. patent application Ser. No. 17/076,881, filed Oct. 22, 2020, "VPWS signaling using Segment Routing," and commonly-assigned U.S. patent application Ser. No. 17/075,186, filed Oct. 20, 2020, "Optimized Layer 3 VPN Control Plane using Segment Routing," the contents of each are incorporated by reference in their entirety and referred to herein as the SR approach. While this SR approach significantly reduces control plane overhead, scalability concerns, and operational complexity, this approach requires an SR underlay network for transport. It would be advantageous to leverage the approaches described in the aforementioned patent applications with SR but using a classical MPLS network instead.

BRIEF SUMMARY OF THE DISCLOSURE

The present disclosure relates to systems and methods for optimized Layer 2 (L2)/Layer 3 (L3) services over classical Multiprotocol Label Switching (MPLS) transport. The approach described herein utilizes Internet Protocol (IP) addresses for data plane Media Access Control (MAC) learning as well as for identifying Broadcast, Unknown Unicast, and Multicast (BUM) traffic. The use of the IP addresses is in contrast to the use of Segment Identifiers (SID) in the SR approach. As such, the approach in the present disclosure provides the capability to enjoy the benefits of the new L2 and L3 service models covering ELAN, ETREE, ELINE/FXC and L3VPN over a classical MPLS network. An operator need only upgrade the edge nodes. The mechanisms described herein provide an ability to realize ELAN, ETREE, ELINE/FXC, and L3VPN in a scalable and simpler manner over legacy MPLS transport without the need to migrate their network to SR. The present disclosure provides the same benefits as the SR approach. Specifically, the use of IP addresses for MAC learning via the data plane instead of the control plane provides fast convergence and scale through conversational learning. The present disclosure further utilizes maintains the benefit of Active/Active (A/A) multihoming and multipathing offered by EVPN. Also, the present disclosure maintains auto-discovery and single side provisioning of the service. Further, the present disclosure greatly reduces the overhead of the existing control plane by at least two orders of magnitude.

Systems and methods include a node in a Multiprotocol Label Switching (MPLS) network to perform steps of determining a plurality of services supported at the node; determining a bitmask to represent the plurality of services supported at the node, wherein the bitmask includes a starting service and each subsequent bit representing another service of the plurality of services and with each bit in the bitmask set based on the plurality of services supported at the node; and transmitting an advertisement to other nodes in the network with the bitmask based on the plurality of services supported at the node. The steps can further include transmitting a packet associated with a service of the plurality of services with an MPLS label stack including one or more transport labels for a destination of the packet, a service label identifying the service, and a source label identifying a source Internet Protocol (IP) address of the packet. The source label can be an anycast IP address for a Multi Home site.

The steps can further include transmitting a packet associated with a service of the plurality of services with an MPLS label stack including one or more transport labels for a destination of the packet, and a service label identifying the service. The MPLS network utilizes Label Switched Paths (LSPs) to carry the plurality of services. The plurality of services can include one of an Ethernet Local Area Network (ELAN), an Ethernet Tree (ETREE), and an Ethernet Private Line (ELINE). The plurality of services can include a Layer 3 Virtual Private Network (L3 VPN).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
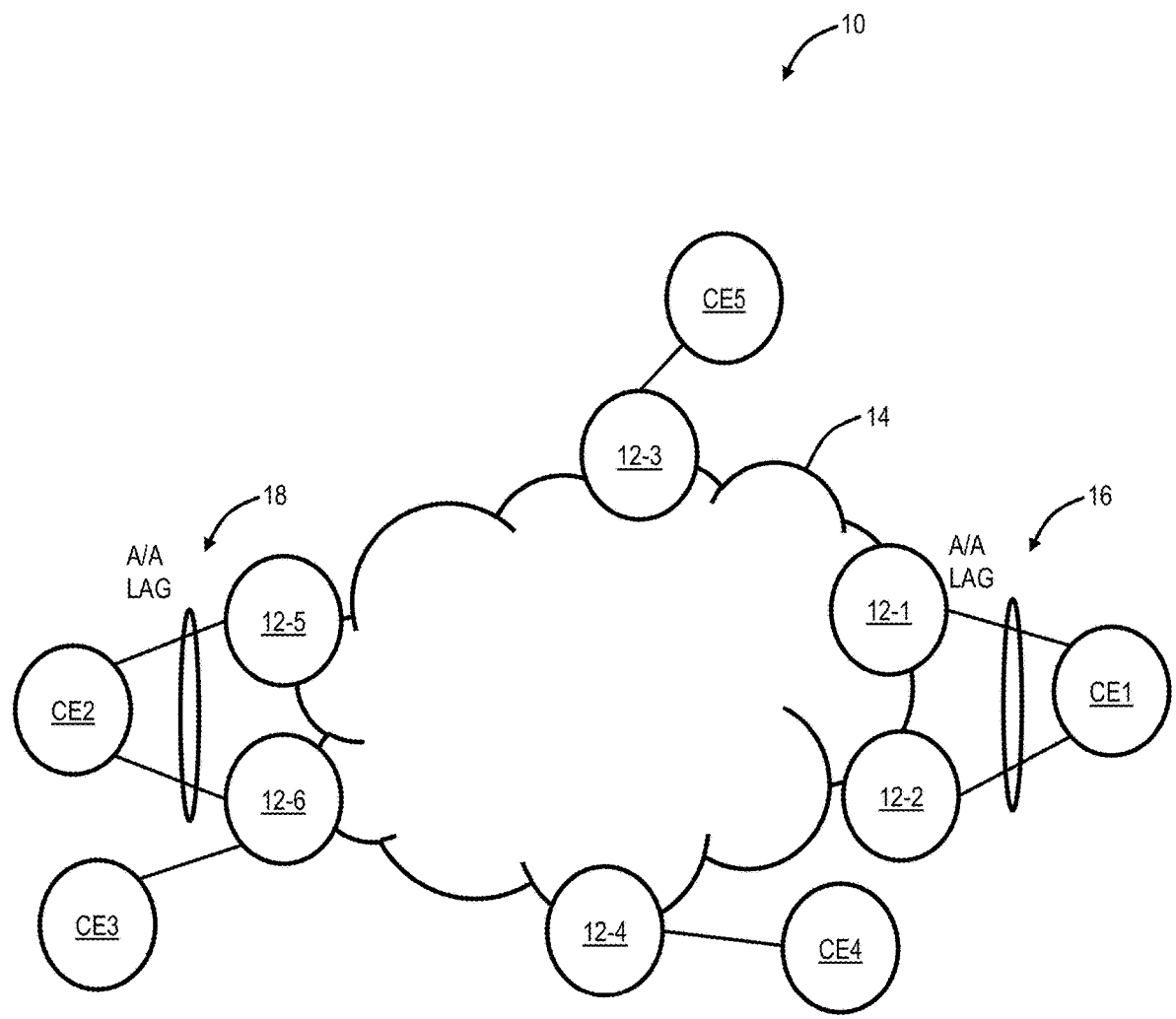
FIG. 1 is a network diagram of an example network, including various nodes in a classical MPLS network as well as various Customer Edge (CE) nodes.

Again, the present disclosure relates to systems and methods for optimized Layer 2 (L2)/Layer 3 (L3) services over classical Multiprotocol Label Switching (MPLS) transport. The approach described herein utilizes Internet Protocol (IP) addresses for data plane Media Access Control (MAC) learning as well as for identifying Broadcast, Unknown Unicast, and Multicast (BUM) traffic. The use of the IP addresses is in contrast to the use of Segment Identifiers (SID) in the SR approach. As such, the approach in the present disclosure provides the capability to enjoy the benefits of the new L2 and L3 service models covering ELAN, ETREE, ELINE/FXC and L3VPN over a classical MPLS network. An operator need only upgrade the edge nodes. The mechanisms described herein provide an ability to realize ELAN, ETREE, ELINE/FXC, and L3VPN in a scalable and simpler manner over legacy MPLS transport without the need to migrate their network to SR. The present disclosure provides the same benefits as the SR approach. Specifically, the use of IP addresses for MAC learning via the data plane instead of the control plane provides fast convergence and scale through conversational learning. The present disclosure further utilizes maintains the benefit of Active/Active (A/A) multihoming and multipathing offered by EVPN. Also, the present disclosure maintains auto-discovery and single side provisioning of the service. Further, the present disclosure greatly reduces the overhead of the existing control plane by at least two orders of magnitude.

Acronyms

The following acronyms, abbreviations, and definitions are utilized herein:

| | |
|---|---|
| A/A | Active/Active; used synonymously with multi-active when a CE is multi-homed to two or more PEs |
| A/S | Active/Standby |
| ARP | Address Resolution Protocol |
| BGP | Border Gateway Protocol |
| BGP-LU | BGP Labeled Unicast |
| BGP-PIC | BGP Prefix Independent Convergence |
| BUM | Broadcast, Unknown Unicast, and Multicast |
| DP | Data Plane |
| DF | Designated Forwarder |
| EAD | Ethernet Auto Discovery Route |
| ECMP | Equal Cost Multi-Path |
| ELAN | Ethernet Local Area Network |
| ELINE | Ethernet Private Line |
| ES | Ethernet Segment; when a CE is MH to PEs via a LAG, MH (PE) peers identify LAG interface as Ethernet Segment |
| ETREE | Ethernet Tree |
| EVPN | Ethernet VPN |
| EVI | Ethernet VPN Instance |
| FXC | Flexible Cross Connect |
| IGP | Interior Gateway Protocol |
| IP | Internet Protocol |
| L3VPN | Layer 3 Virtual Private Network |
| LAG | Link Aggregation Group |
| LAN | Local Area Network |
| LDP | Label Distribution Protocol |
| LSP | Label Switched Path |
| MAC | Media Access Control |
| MH | Multi-home |
| MPLS | Multiprotocol Label Switching |
| NG-VPWS | Next Generation Virtual Private Wire Service |
| NG-VPLS | Next Generation Virtual Private LAN Service |
| p2mp | Point-to-Multipoint |
| P2P | Point-to-Point |
| PE | Provider Edge |
| PW | Pseudowire |
| RSVP-TE | Resource Reservation Protocol - Traffic Engineering |
| RT | Route Target; EVPN uses BGP RTs with import/export policy to form EVI member group |
| SAFI | Subsequent Address Family Identifiers |
| SH | Split Horizon |
| SID | Segment Identifier |
| SRGB | Segment Routing Global Block |
| TLV | Type Length Value |
| UCMP | Unequal Cost Multipath |
| VID | VLAN Identifier |
| VLAN | Virtual Local Area Network |
| VPLS | Virtual Private LAN Service |
| VPN | Virtual Private Network |
| VPWS | Virtual Private Wire Service |

Network

FIG. 1 is a network diagram of an example network 10, including various nodes 12 (labeled as nodes 12-1-12-6) in a classical MPLS network 14 as well as various Customer Edge (CE) nodes (labeled CE1-CE5). The CE nodes include a CE node CE2 in an Active/Active LAG 16, and a CE node CE1 in an Active/Active LAG 18 configuration. Of note, those skilled in the art will recognize the network 10 is presented for illustration purposes, and various configurations are possible. The PE nodes 12 are configured to use IP addresses for MAC learning (i.e., which source (CE) MAC address in the received L2 packet is associated with which PE node) instead of using EVPN Route Types 1, 2, 3 and 4.

Note, as described herein, "classical MPLS" transport refers to the ability to carry traffic over Label Switched Paths (LSPs) established via LDP, RSVP-TE, and/or BGP-LU.

Label Stack

The following table illustrates a label stack for a service.

| |
|---|
| Transport label |
| Service label |
| Source IP address label |
| L2 Packet |

Each of the transport label, the service label, and the source IP address label are MPLS labels added to the L2 packet. The transport label is used to direct the packet to the destination. The service label for an ELAN uniquely identifies the ELAN, and the Source IP address label is an IP address used for DP MAC learning.

Optimized ELAN Service Discovery

The ELAN service label is an MPLS label and it can be signaled by IGP or BGP for service auto discovery. For efficiency, the advertisement can include a bitmap of service labels it is configured with configured and a broadcast node IP address for BUM. The present disclosure contemplates the use of a bitmap for signaling. As is known in the art, a bitmap is a representation in which each bit in a sequence of bits corresponds to information; namely, a first-bit location corresponds to a specific start Service label, and each bit location that follows represents the following Service labels in sequence. Each bit in the bitmap is 1 to denote the inclusion of that Service label or 0 to denote exclusion. This enables a single advertisement to include multiple Service labels versus a single advertisement for each.

In the network 10, the nodes 12-1 to 12-6 each flood service labels they have been configured within IGP/BGP. The flooding information can be used to discover services configured on remote nodes and build p2mp flooding trees for L2 BUM traffic. It is possible to build inclusive p2mp flooding trees per service or aggregate inclusive for a group of service labels. Ingress replication per service could be used for broadcasting traffic using its broadcast IP address.

Optimized ELAN Service A/A Redundancy

Figure 2:
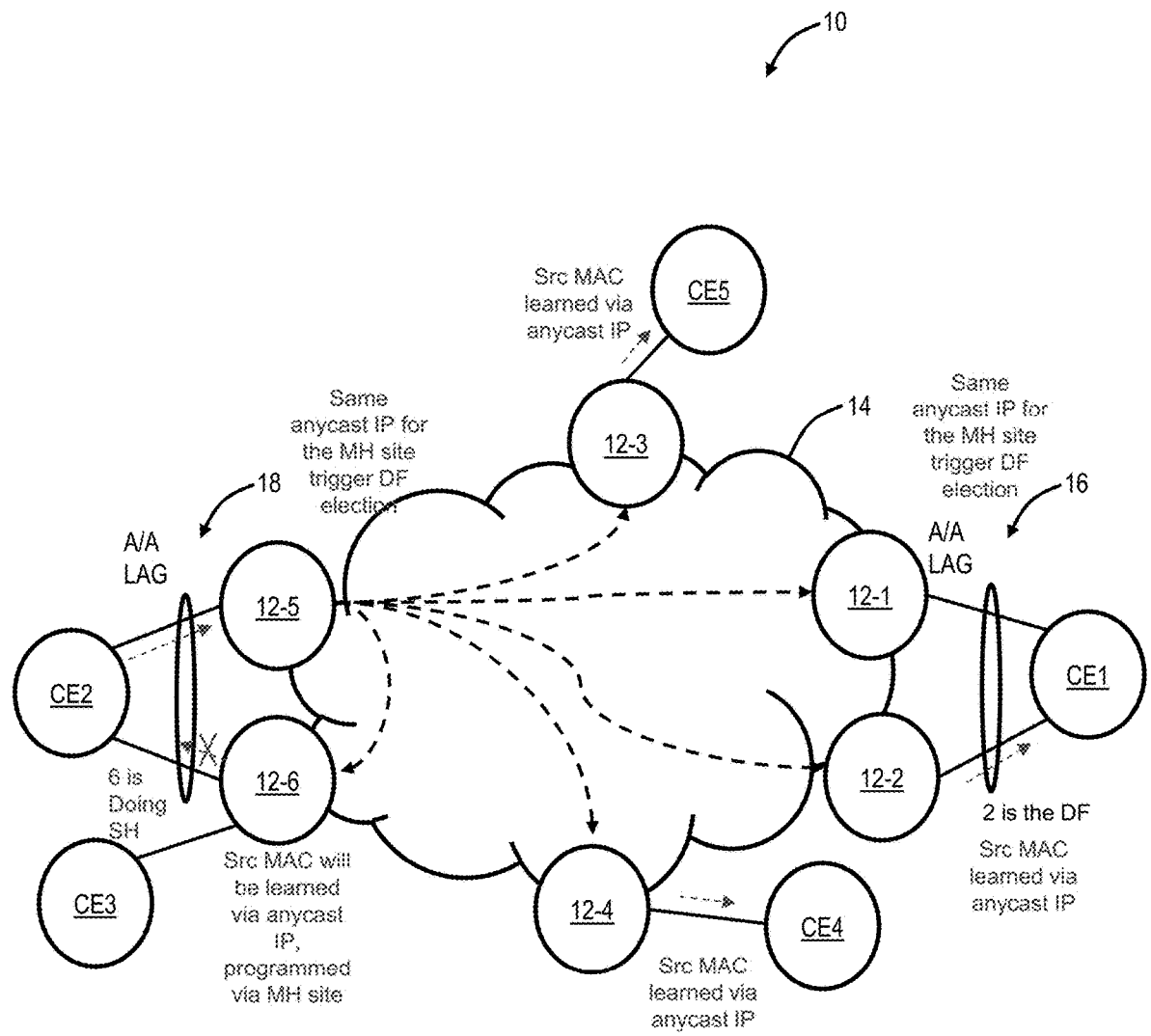
FIG. 2 is a network diagram of the network illustrating optimized ELAN service A/A redundancy.

FIG. 2 is a network diagram of the network 10 illustrating optimized ELAN service A/A redundancy. An Anycast IP address per Ether-Segment (ES) is configured on all nodes attached to an MH site, e.g., the CE2 attached to the nodes 12-5, 12-6 and the CE1 attached to the nodes 12-1, 12-2, and is flooded via IGP/BGP for reachability through the set of nodes connected to the MH site. Each node 12-1, 12-2, 12-5, 12-6 attached to the MH site will advertise the same anycast IP to allow other nodes to discover the membership, and perform DF election. Aliasing/Multipathing is achieved using the same mechanisms used with classical MPLS transport. For example, when the node 12-5 learns a MAC address from the CE2, it floods it to all other nodes 12, including the node 12-6, so each node 12 learns the address as reachable via the anycast IP address owned by the nodes 12-5, 12-6. The node 12-6 applies Split Horizon and hence does not send the packet back to the MH CE2, but treats the MAC as reachable via the MH CE. The Anycast IP address is placed in the Source IP address label.

Optimized ELAN Service Data Plane MAC Learning

Figure 3:
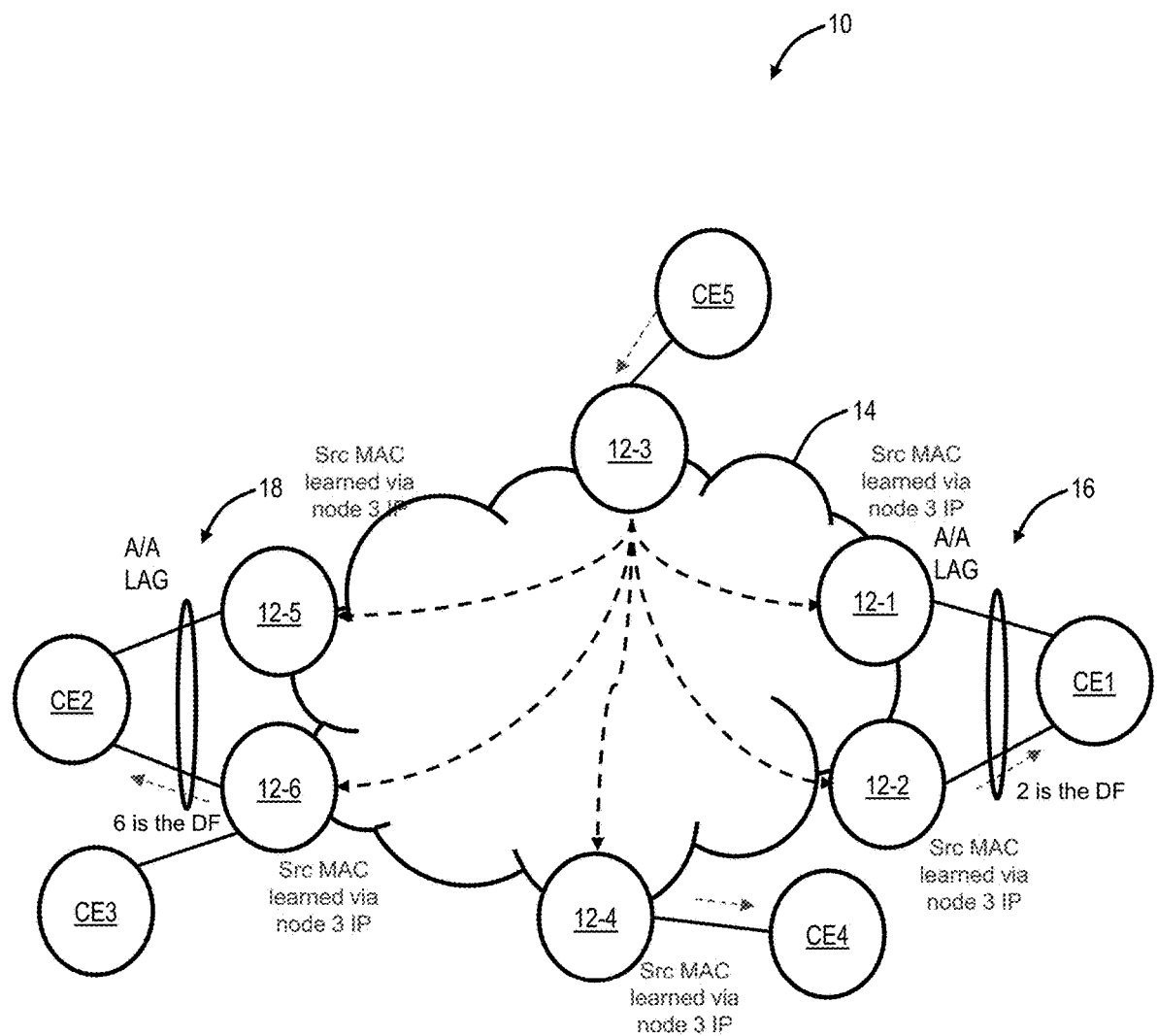
FIG. 3 is a network diagram of the network illustrating optimized ELAN service data plane MAC learning.

FIG. 3 is a network diagram of the network 10 illustrating optimized ELAN service data plane MAC learning. The MAC addresses are learned through the data plane against the source node's 12 IP address, encapsulated under the Service label in the L2 packet. For example, in FIG. 3, the node 12-3 learns a MAC address from the CE5 and floods it to all nodes 12 configured with the same Service label. The nodes 12-1, 12-2, 12-4, 12-5, 12-6 learn the MAC as reachable via the node 12-3 based on the source IP address included in the data packet.

Optimized ELAN Service ARP Suppression

ARP packet requests and replies can be gleaned to learn IP/MAC binding for ARP suppression. ARP replies are unicast, however, flooding ARP replies can allow all nodes to learn the MAC/IP bindings for the destinations too.

Optimized ELAN Service Mass Withdrawal

Figure 4:
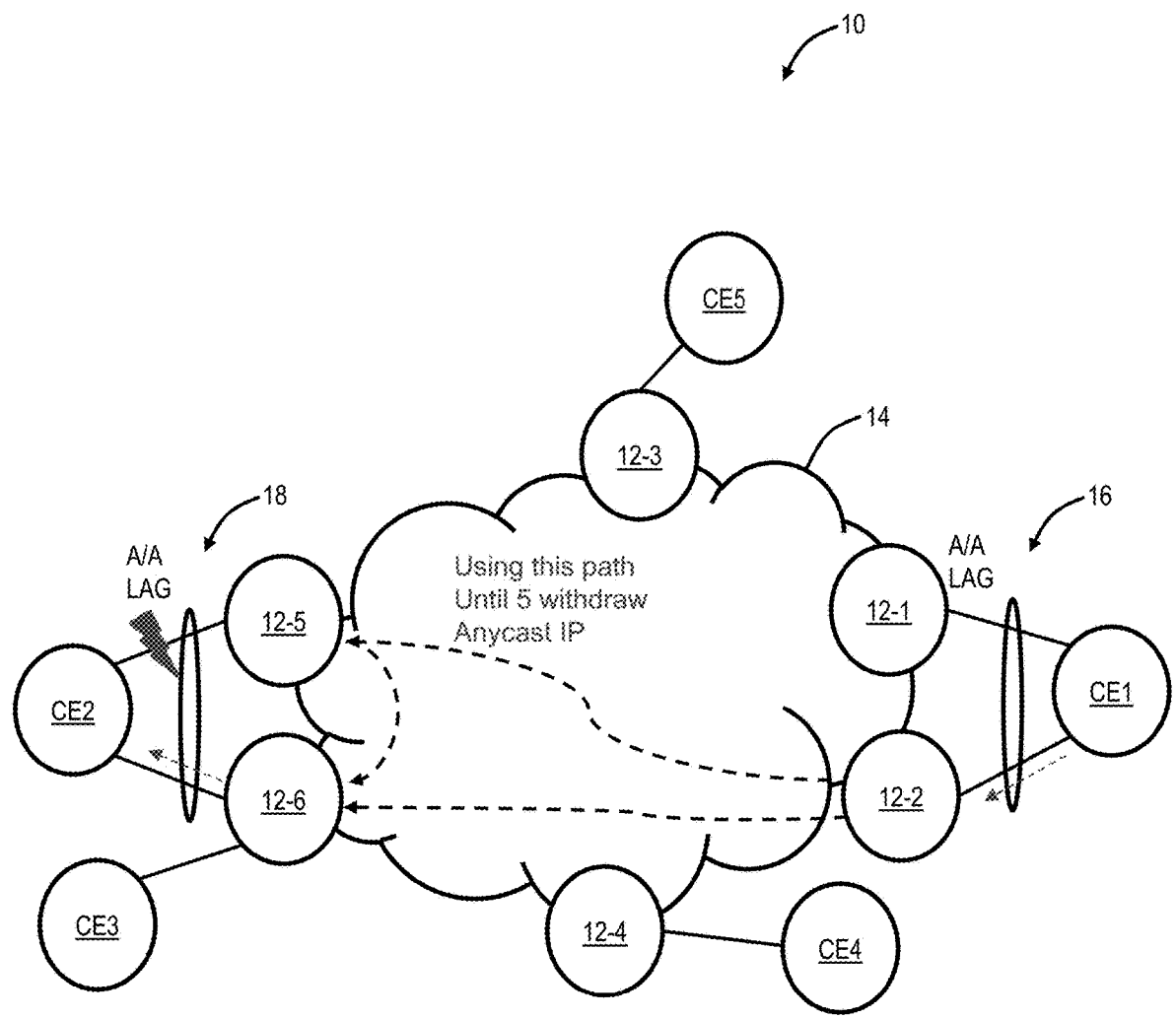
FIG. 4 is a network diagram of the network illustrating optimized ELAN service mass withdrawal.

FIG. 4 is a network diagram of the network 10 illustrating optimized ELAN service mass withdrawal. Failure of one of the nodes 12 is handled via IGP/BGP convergence, and as such there is no need for any explicit MAC withdrawal mechanism. For example, on a failure, the node 12-5 can withdraw the anycast IP address associated with the site from IGP/BGP in order not to draw any traffic destined to the CE2. The node 12-5 can send the received L2 packet from the core to the other node 12-6 connected to the MH CE2 assuming nodes share the same anycast IP address and incoming transport label for fast convergence until the node 12-5 withdraws the anycast IP associated with the MH site from IGP/BGP.

Optimized ELAN Service Multipathing

Packets destined to the MH CE2 connected to the nodes 12-5, 12-6 can be load-balanced (ECMP/UCMP) across the network 10 to the nodes 12-5, 12-6, given that it was learnt via the anycast IP owned by the nodes 12-5, 12-6.

Optimized ELAN Service Benefits

MAC learning in the data plane yields fast convergence, fast MAC move and scale through conversational learning. This approach supports Active-Active multihoming, and multipathing, and ARP suppression. Advantageously, the network 10 can be based on classical MPLS transport, and does not mandate SR underlay. This is a significant benefit in terms of upgrading networks as only edge nodes need to be upgraded (ideal for brownfield—existing deployments). This approach also includes at least two order of magnitude scale improvements over legacy PWs. Also, this approach yields the benefits of anycast address (redundancy and fast convergence) as well as eliminates the need for DF election.

The following table illustrates a comparison of conventional EVPNs with the optimized ELAN described herein.

| Protocol/Function | EVPN | Optimized ELAN |
|---|---|---|
| Service Discovery BUM traffic handling | EAD RT-1 per Service + RD + RTs IMET RT-3 per Service + RD + RTs. 10K services on 100 nodes = 20K routes per node, Total = 2 Million BGP routes. | One Route containing Bitmap of Services supported + BroadCast Node label for BUM 10K services per 100 nodes = 1 Route per node, Total = 100 BGP routes |
| MAC Learning ARP suppression | One RT-2 per MAC/IP 1 Million MAC routes = 1 Million BGP routes. MAC move control plane complex logic. No conversational learning. ARP suppression use MAC/IP RT-2. | DP mac learning 0 BGP routes. No MAC move handling. Conversational Learning. ARP suppression can be achieved via DP learning and flooding ARP replies. |

| Protocol/Function | EVPN | Optimized ELAN |
| --- | --- | --- |
| MH Handling | One Per ES EAD route + SH Label per MH Site. One RT-4 per MH site. On ES down, withdraw Per ES EAD route. Per EVI EAD routes. X MAC routes. RT-4. | One Anycast label per MH site. On ES down: Withdraw Anycast label. |
| Convergence | Define overlay convergence, like: MASS-Withdraw. Overlay ECMP through Remote ESI. BGP-PIC for MAC routes. | Depends only on underlay convergence. |

Also, the aforementioned benefits also apply to ETREE, ELINE, and L3VPN that are described as follows. This approach supports Active-Active multihoming, and multipathing, and ARP suppression. Advantageously, the network 10 can be based on classical MPLS transport, and does not mandate SR underlay. This is a significant benefit in terms of upgrading networks as only edge nodes need to be upgraded (ideal for brownfield—existing deployments).

Optimized ETREE Service Discovery

Figure 5:
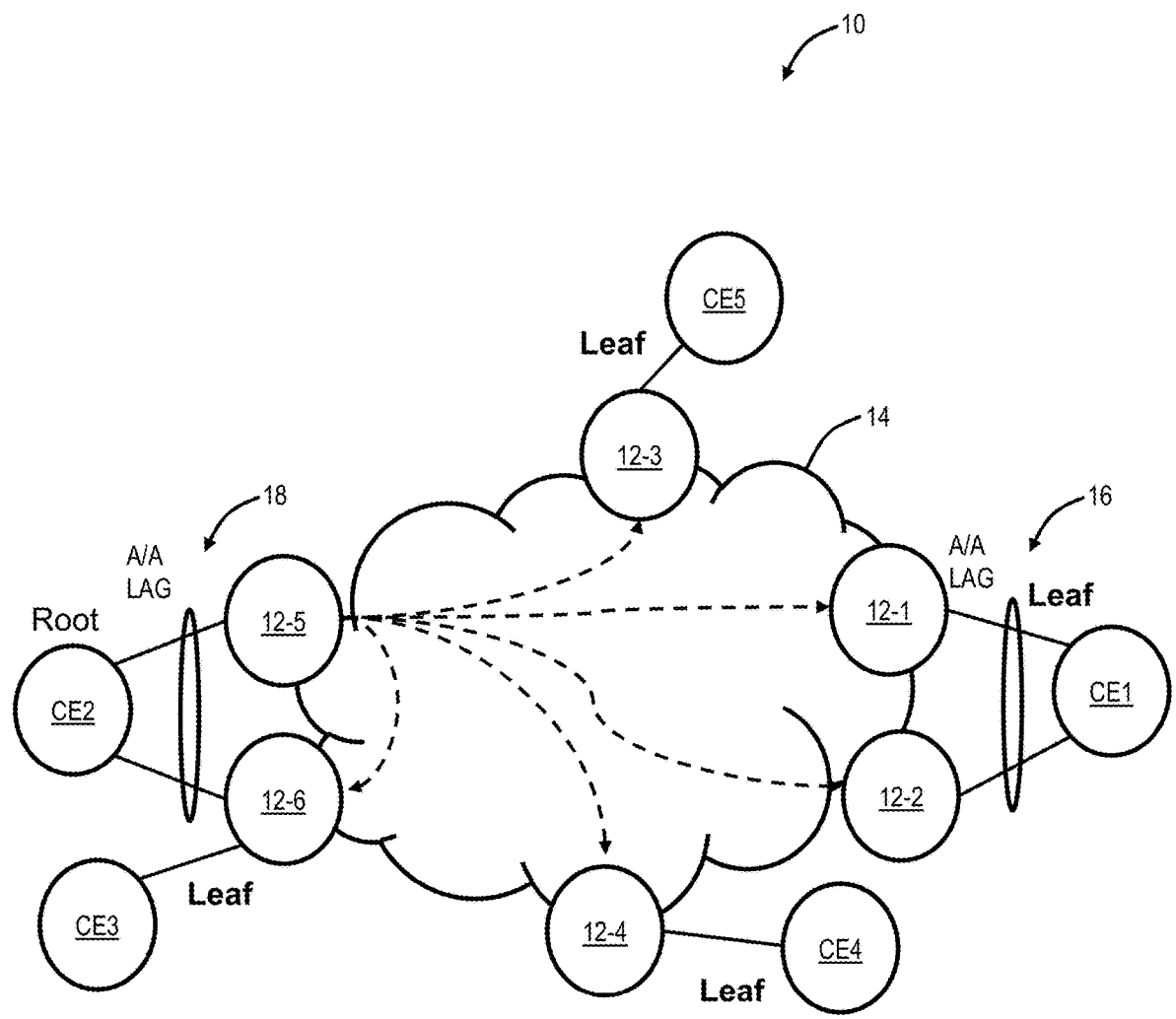
FIG. 5 is a network diagram of the network illustrating optimized ETREE service discovery.

FIG. 5 is a network diagram of the network 10 illustrating optimized ETREE service discovery. Similar to the ELAN, the ETREE service MPLS label is signaled via IGP/BGP for service auto discovery such that a single service route contains the start of the service label and a bitmap of service labels configured and a broadcast IP address for BUM+Leaf Node IP for traffic from leaf. The nodes 12-1 to 12-6 floods the services labels they are configured with via IGP/BGP. The flooding information can be used to discover the services configured on a remote node, as well can help build p2mp flooding trees for L2 BUM traffic. It is possible to build inclusive p2mp flooding trees per service, or aggregate inclusive for a group of service labels. Ingress replication per service could be used for replicating traffic using a broadcast label.

Optimized ETREE Service A/A Redundancy

Figure 6:
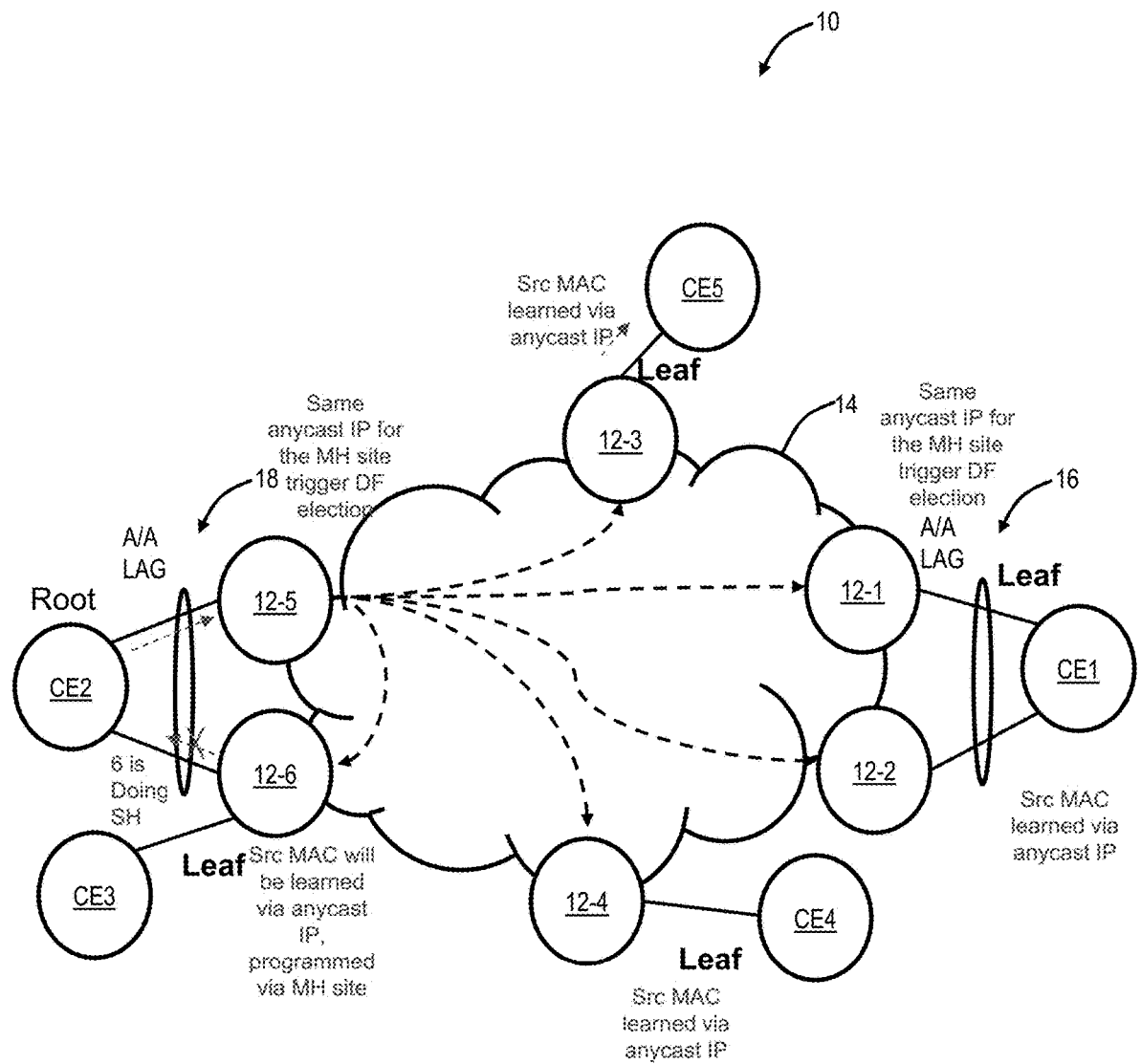
FIG. 6 is a network diagram of the network illustrating optimized ETREE service A/A redundancy.

FIG. 6 is a network diagram of the network 10 illustrating optimized ETREE service A/A redundancy. An Anycast IP address per Ether Segment is configured on all nodes 12-1, 12-2, 12-5, 12-6 attached to the MH site with leaf indication if the site is a leaf, and is flooded (by the node attached to the MH site) via IGP/BGP to advertise reachability. Upon receiving a flooding update from a root node, the leaf nodes forward the update to its local sites. Each node attached to the MH site will advertise the same anycast IP address, to allow other nodes to discover the membership and perform DF election. Aliasing/Multipathing is achieved using the same mechanisms used for anycast IP.

For example, when a node 12-5 learns a MAC address from a CE2 it floods it to all nodes 12 including the other node(s) 12-6 hosting the MH site so that other nodes can learn that the MAC address is reachable via the anycast IP address associated with the nodes 12-5, 12-6 hosting MH site. The node 12-6 applies Split Horizon and hence does not send the packet back to the MH CE2, but treats the MAC as reachable via the MH CE, as well forwards the MAC address to the local leaf site.

Optimized ETREE Data Plane MAC Learning

Figure 7:
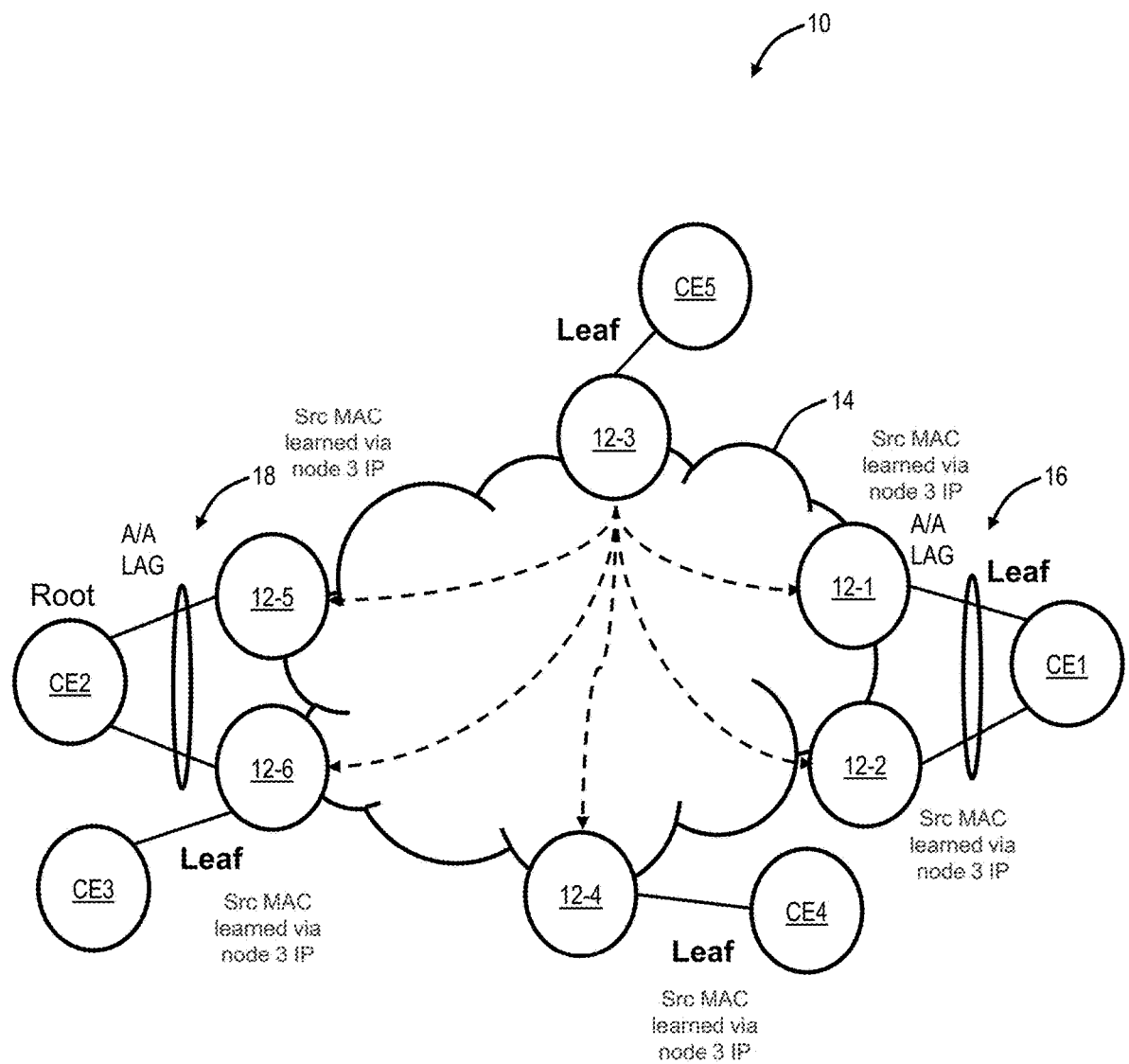
FIG. 7 is a network diagram of the network illustrating optimized ETREE data plane MAC learning.

FIG. 7 is a network diagram of the network 10 illustrating optimized ETREE data plane MAC learning. MAC addresses are learned through the data plane against the source leaf node's IP address encapsulated under the service label in the L2 forwarded packets. For example, when the node 12-3 learns a MAC address, it floods it to all nodes 12 configured with the same Service label. The nodes 12-1, 12-2, 12-4 learn the MAC address as reachable via the leaf node IP attached to the node 12-3 and hence do not forward it to their leaf site. The nodes 12-5, 12-6 learn the MAC as reachable via the source node IP address attached to node 12-3, and node 12-6 (DF) forwards the MAC address only to the root site.

Optimized ETREE Service ARP Suppression

Similar to ELAN, ARP packet requests and replies can be gleaned to learn IP/MAC binding for ARP suppression. ARP replies are unicast, however, flooding ARP replies can allow all nodes to learn the MAC/IP bindings for the destinations too.

Optimized ETREE Service Mass Withdrawal

Figure 8:
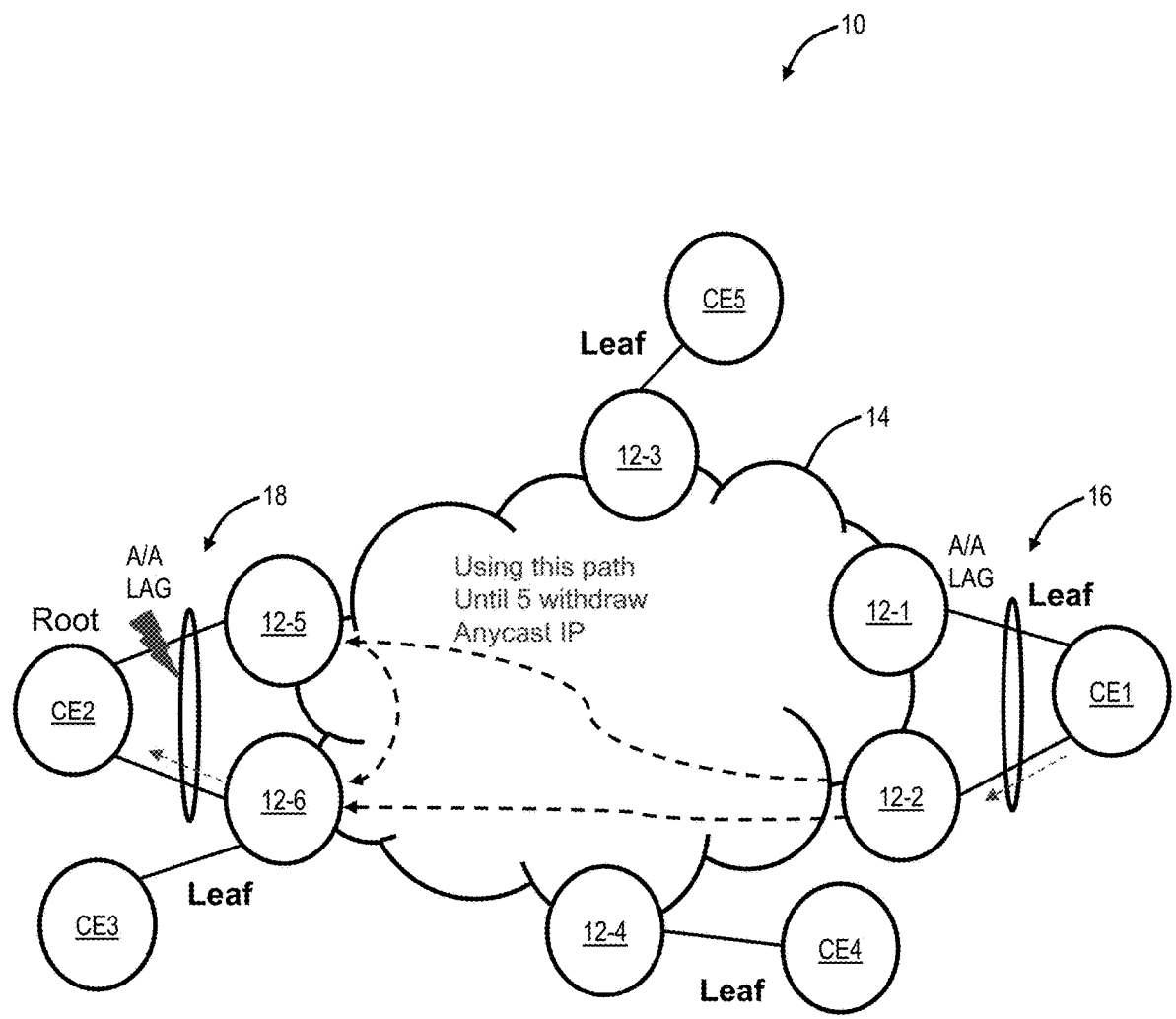
FIG. 8 is a network diagram of the network illustrating optimized ETREE service mass withdrawal.

FIG. 8 is a network diagram of the network 10 illustrating optimized ETREE service mass withdrawal. Node failure is detected via IGP/BGP convergence, and as such, there is no need to flood any explicit MAC withdrawal. On a link failure, the node 12-5 detecting the failure withdraws the IP address associated with the site from IGP/BGP in order not to attract packets destined to the MH site. On link failure between the node 12-5 and the CE2, the node 12-5 can send the received L2 packet from the core to other nodes 12-6 connected to the MH CE (node 12-5 using the node 12-5 label), for fast convergence until it withdraws the anycast IP address associated with the MH site.

Optimized ETREE Multipathing

A packet destined to the MH CE connected to the nodes 12-5, 12-6, will be load-balanced (ECMP/UCMP) across the core to nodes 12-5, 12-6, given that it was learned via anycast IP owned associated with nodes 12-5, 12-6.

Optimized ETREE Benefits

This approach signals a per Node leaf IP address to be used as a source node IP for traffic originating from leaf, and an anycast IP address with a leaf indication for an MH leaf site. This yields the benefits of data-plane MAC learning (fast convergence, fast MAC move, etc.) and scales through conversational learning. Again, the network 10 can be based on classical MPLS transport, and does not mandate SR underlay. This brings the benefit of A/A multihoming, and multipathing, and ARP suppression for leaf Multi-home site, and leverages the benefits of anycast IP, for redundancy and fast convergence and to discover nodes sharing the same anycast label to perform DF election.

Optimized ELINE and FXC Service Discovery

An ELINE Service label is signaled via IGP/BGP for service auto discovery such that a service route contains a start Service label and a bitmap of service labels configured, or one service label and the start of normalized VID and bitmap of normalized VIDs configured as well as the local node IP address associated with ELINE Services. In the network 10 or other networks, tens of thousands of normalized VIDs can be configured between two service endpoints. With the existing mechanisms, tens of thousands of BGP EVPN EAD advertisements are required to signal the status of ES. With the proposed mechanism, few route updates are sufficient. In the network 10, the nodes 12-1 to 12-6 flood the service labels they are configured with via IGP/BGP. The flooding information can be used to discover the services configured on a given node.

The following table illustrates a label stack for an ELINE service.

| |
|---|
| Transport label |
| Service label |
| L2 Packet |

Optimized ELINE and FXC Service A/A or A/S

An Anycast IP address is configured per ES on all nodes 12-1, 12-2, 12-5, 12-6 attached to the MH site, flooded by IGP/BGP for reachability through the set of nodes connected to the MH site. Each node attached to the MH site will advertise the same anycast IP, to allow other nodes to discover the membership. A packet destined to the MH CE2 connected to the nodes 12-5, 12-6 will be ECMP across the network 10 to the nodes 12-5, 12-6, given that it was learned in the control plane via the transport LSP associated with the anycast IP owned by the nodes 12-5, 12-6.

Optimized ELINE and FXC Benefits

This approach greatly reduces the BGP Control Plane overhead of existing EVPN/VPWS and control plane messages will be at least two order of magnitude less than current EVPN. This removes the overhead of RDs and RTs associated with each EVPN route presenting a service. This further brings the benefit of A/A multihoming, and multipathing, for MH site. The present disclosure uses legacy transport, i.e., LDP, BGP-LU and RSVP-TE, i.e., does not require an SR in the SP underlay. Again, this is a benefit for brownfield deployments where only the edges need to be upgraded. This eliminates the need at all for implementing any sort of convergence and redundancy at the overlay (EVPN/BGP or LDP) layer. Further, this supports auto-discovery and single-sided service provisioning.

Optimized L3VPN Service Scale Concern

Existing L3VPN mechanisms suffer from scale concerns as the number of VPN routes increases in the network 10, as each L3VPN route advertisement is prepended with an 8 bytes RD to allow IP address space to be reused by multiple VPNs, associated with set of extended communities, i.e., RTs, associated with other attributes such as local-pref, MED, color, etc., and associated with a tunnel encapsulation, aka MPLS label.

Optimized L3VPN Service Approach

The present disclosure can maintain the existing L3VPN semantics to (1) allow overlapping IP addresses to be used across multiple VPNs and (2) associate routes with attributes. This allows operators to represent an L3VPN instance by one or more globally allocated Service label(s). The VPN route import/export is governed by label and allows operator to deploy extranet, hub-and-spoke and mesh VPN topologies. RT-based import/export can also be used to support non-mesh L3VPN sites. This provides Active/Active Redundancy and multipathing using underlay anycast IPs for Multi-Homed (MH) L3VPN sites.

The proposed approach greatly reduces the BGP overhead of existing L3VPN control plane by at least two orders of magnitude and in mesh scenarios by up to four order of magnitude. Further, this does not compromise the desired benefits of L3VPN and EVPN prefix advertisement (RT-5), such as support of multi-active redundancy on access, multipathing in the core, auto-provisioning and auto-discovery.

The crux of the scheme is how the routes are advertised. The approach includes to advertise the ENCAP as the unique route. With SRv6 with label, the ENCAP will be an IPv6 prefix that contains both node label for the PE router as well as the service label representing the VPN. In common cases, this will be a /64 globally unique prefix. VPN prefixes will be the attributes of the route. A new BGP message will be used to advertise the route and attributes in the new format. The goal is to pack as many VPN prefixes as possible in a single BGP message. VPNv4/v6 prefixes along with operation type, i.e., to inform BGP neighbors whether prefixes are added or deleted, will be advertised in new TLV. About 12K VPNv4 prefixes can be packed in a 64K message. The prefix length followed by prefixes sharing the same prefix length will be packed in the message. L3VPN Service labels may be allocated from an SRGB range dedicated only for L3VPN service.

Optimized L3VPN Service A/A or A/S

Each node advertises (1) regular Node IP nexthop to be used by the node when L3VPN service is attached to local Single-Home sites and (2) Anycast IP per Multi-Home site when L3VPN service is attached to the Multi-Home (MH) site via IGP/BGP. With the use of anycast IP per MH site, shared by PEs nodes 12 attached to the site, there is no need to implement any BGP-PIC techniques at the L3VPN layer, as the routing convergence relies on the underlay. L3VPN routes associated with an MH site will be advertised as a single IPv6 route containing both anycast IP of the egress PE and service labels. Multipathing/Fast convergence is achieved using the same mechanisms used for anycast IP.

Optimized L3VPN Benefits

This greatly reduces the BGP Control Plane overhead of existing L3VPN and EVPN. The control plane messages will be at least two to four order of magnitude less than the current L3VPN/EVPN. This also removes the overhead of RDs and RTs associated with each L3VPN/EVPN route presenting a service. Further, this brings the benefit of A/A multihoming, and multipathing, for MH site, and leverages benefits of anycast IP for Redundancy and fast convergence. Again, the present disclosure uses legacy transport, i.e., LDP, BGP-LU and RSVP-TE, i.e., does not require an SR in the underlay.

Process

Figure 9:
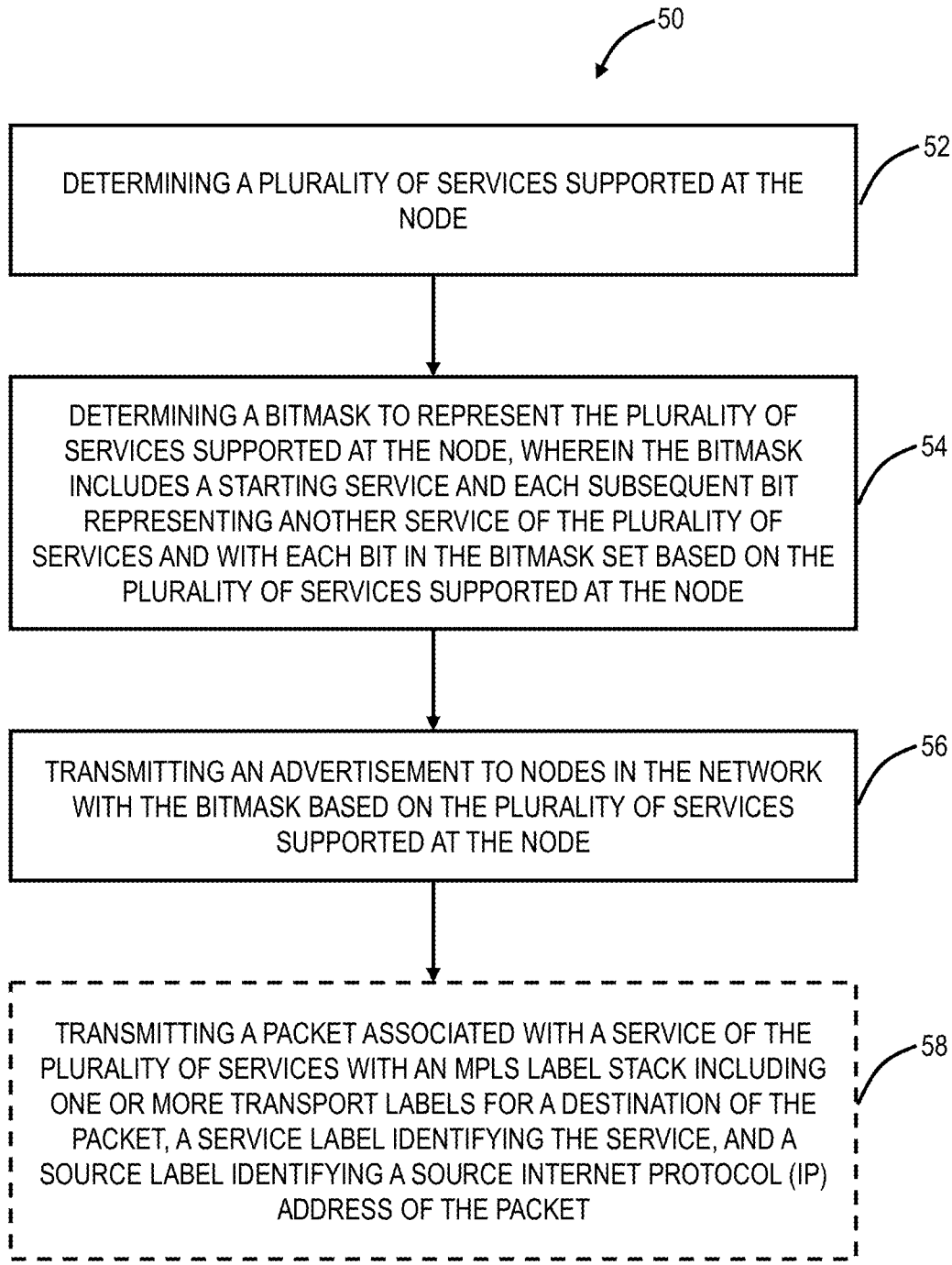
FIG. 9 is a flowchart of a process for optimized L2/L3 services over a classical MPLS network.

FIG. 9 is a flowchart of a process 50 for optimized L2/L3 services over a classical MPLS network. The process 50 contemplates implementation as a method, via a node 12, and as a non-transitory computer-readable medium having instructions stored thereon for programming a node in to perform steps.

The process 50 includes determining a plurality of services supported at the node (step 52); determining a bitmask to represent the plurality of services supported at the node, wherein the bitmask includes a starting service and each subsequent bit representing another service of the plurality of services and with each bit in the bitmask set based on the plurality of services supported at the node (step 54); and transmitting an advertisement to nodes in the network with the bitmask based on the plurality of services supported at the node (step 56).

The process 50 can further include transmitting a packet associated with a service of the plurality of services with an MPLS label stack including one or more transport labels for a destination of the packet, a service label identifying the service, and a source label identifying a source Internet Protocol (IP) address of the packet (step 58). The source label can be an anycast IP address for a Multi Home site. The process 50 can also further include transmitting a packet associate with a service of the plurality of services with an MPLS label stack including one or more transport labels for a destination of the packet, and a service label identifying the service.

The MPLS network utilizes Label Switched Paths (LSPs) to carry the plurality of services. The plurality of services can include an Ethernet Local Area Network (ELAN), an Ethernet Tree (ETREE), an Ethernet Private Line (ELINE), and/or a Layer 3 Virtual Private Network (L3 VPN).

Example Node

Figure 10:
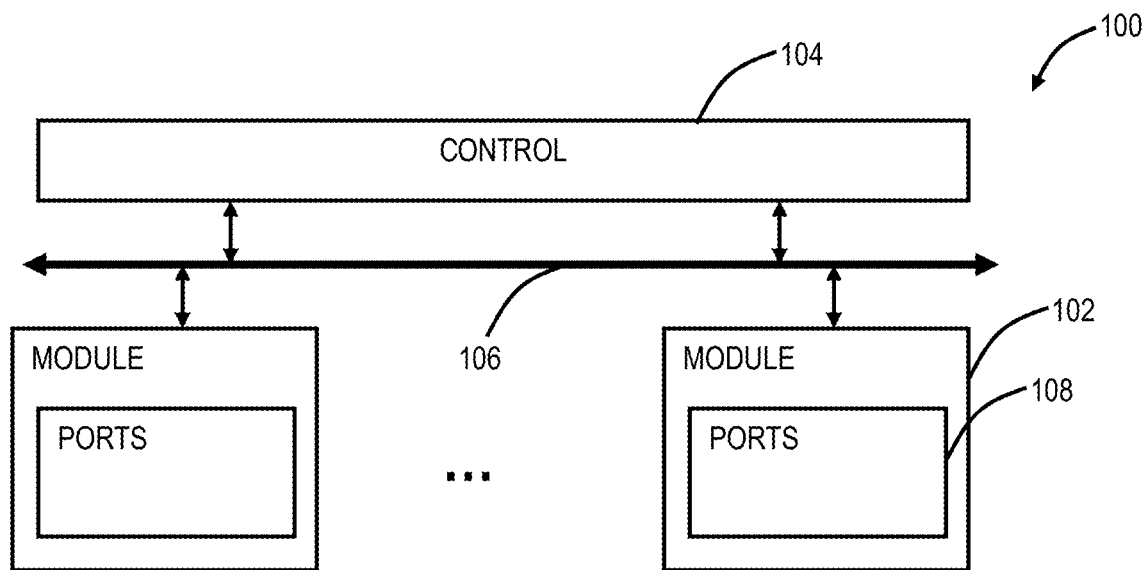
FIG. 10 is a block diagram of an example implementation of a node, such as for the node in the network of FIGS. 1-8.

FIG. 10 is a block diagram of an example implementation of a node 100, such as for the node 12 in the network 10. Those of ordinary skill in the art will recognize FIG. 10 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the SR controller 16, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 11:
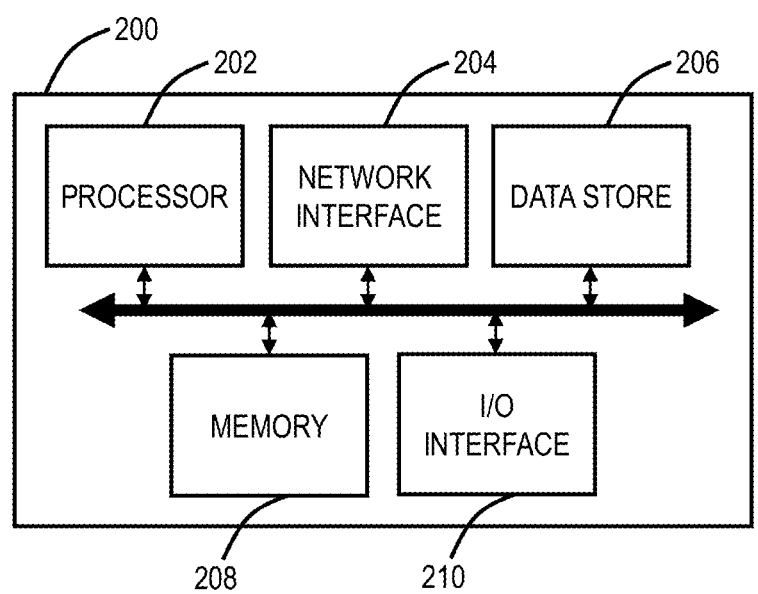
FIG. 11 is a block diagram of an example controller, which can form a controller for the node of FIG. 10.

FIG. 11 is a block diagram of an example controller 200, which can form a controller for the node 12. The controller 200 can be part of the node 12 or a stand-alone device communicatively coupled to the node 100. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a node in a Multiprotocol Label Switching (MPLS) network to perform steps of:
    determining a plurality of services supported at the node;
    determining a bitmap to represent the plurality of services supported at the node, wherein the bitmap includes a starting service having an MPLS label and each subsequent bit representing the MPLS label of another service of the plurality of services in order and with each bit in the bitmap set based on the plurality of services supported at the node and such that each MPLS label of the plurality of services supported at the node is represented by a single bit in an advertisement; and
    transmitting the advertisement to other nodes in the MPLS network with the bitmap based on the plurality of services supported at the node.

2. The non-transitory computer-readable medium of claim 1, wherein the steps further include:
    transmitting a packet associated with a service of the plurality of services with an MPLS label stack including one or more transport labels for a destination of the packet, a service label identifying the service, and a source label identifying a source Internet Protocol (IP) address of the packet.

3. The non-transitory computer-readable medium of claim 2, wherein the source label is an anycast IP address for a Multi Home site.

4. The non-transitory computer-readable medium of claim 1, wherein the steps further include:
    transmitting a packet associated with a service of the plurality of services with an MPLS label stack including one or more transport labels for a destination of the packet, and a service label identifying the service.

5. The non-transitory computer-readable medium of claim 1, wherein the MPLS network utilizes Label Switched Paths (LSPs) to carry the plurality of services.

6. The non-transitory computer-readable medium of claim 1, wherein the plurality of services include one of an Ethernet Local Area Network (ELAN), an Ethernet Tree (ETREE), and an Ethernet Private Line (ELINE).

7. The non-transitory computer-readable medium of claim 1, wherein the plurality of services include a Layer 3 Virtual Private Network (L3VPN).

8. A node in a Multiprotocol Label Switching (MPLS) network comprising:
    a plurality of ports and a switching fabric between the plurality of ports; and
    a controller configured to
        determine a plurality of services supported at the node;
        determine a bitmap to represent the plurality of services supported at the node, wherein the bitmap includes a starting service having an MPLS label and each subsequent bit representing the MPLS label of another service of the plurality of services in order and with each bit in the bitmap set based on the plurality of services supported at the node and such that each MPLS label of the plurality of services supported at the node is represented by a single bit in an advertisement; and
        cause transmission of the advertisement to other nodes in the MPLS network with the bitmap based on the plurality of services supported at the node.

9. The node of claim 8, wherein the controller is further configured to:
    cause transmission of a packet associated with a service of the plurality of services with an MPLS label stack including one or more transport labels for a destination of the packet, a service label identifying the service, and a source label identifying a source Internet Protocol (IP) address of the packet.

10. The node of claim 9, wherein the source label is an anycast IP address for a Multi Home site.

11. The node of claim 8, wherein the controller is further configured to:

cause transmission of a packet associated with a service of the plurality of services with an MPLS label stack including one or more transport labels for a destination of the packet, and a service label identifying the service.

12. The node of claim 8, wherein the MPLS network utilizes Label Switched Paths (LSPs) to carry the plurality of services.

13. The node of claim 8, wherein the plurality of services include one of an Ethernet Local Area Network (ELAN), an Ethernet Tree (ETREE), and an Ethernet Private Line (ELINE).

14. The node of claim 8, wherein the plurality of services include a Layer 3 Virtual Private Network (L3VPN).

15. A method performed by a node in a Multiprotocol Label Switching (MPLS) network comprising:
   determining a plurality of services supported at the node;
   determining a bitmap to represent the plurality of services supported at the node, wherein the bitmap includes a starting service having an MPLS label and each subsequent bit representing the MPLS label of another service of the plurality of services in order and with each bit in the bitmap set based on the plurality of services supported at the node and such that each MPLS label of the plurality of services supported at the node is represented by a single bit in an advertisement; and
   transmitting the advertisement to other nodes in the MPLS network with the bitmap based on the plurality of services supported at the node.

16. The method of claim 15, further comprising:
   transmitting a packet associated with a service of the plurality of services with an MPLS label stack including one or more transport labels for a destination of the packet, a service label identifying the service, and a source label identifying a source Internet Protocol (IP) address of the packet.

17. The method of claim 16, wherein the source label is an anycast IP address for a Multi Home site.

18. The method of claim 15, further comprising:
   transmitting a packet associated with a service of the plurality of services with an MPLS label stack including one or more transport labels for a destination of the packet, and a service label identifying the service.

19. The method of claim 15, wherein the MPLS network utilizes Label Switched Paths (LSPs) to carry the plurality of services.

20. The method of claim 15, wherein the plurality of services include any of an Ethernet Local Area Network (ELAN), an Ethernet Tree (ETREE), an Ethernet Private Line (ELINE), and a Layer 3 Virtual Private Network (L3VPN).

* * * * *